United States Patent [19]

Suzuki et al.

[11] Patent Number: 4,924,247
[45] Date of Patent: May 8, 1990

[54] APPARATUS AND METHOD FOR CORRECTING AND ADJUSTING PARALLAX IN ELECTRONIC CAMERA

[75] Inventors: Nobuharu Suzuki; Harumi Aoki; Tahei Morisawa, all of Tokyo, Japan

[73] Assignee: Asahi Kogaku Kogyo Kabushiki Kaisha, Tokyo, Japan

[21] Appl. No.: 321,381

[22] Filed: Mar. 10, 1989

[30] Foreign Application Priority Data

Mar. 11, 1988 [JP] Japan ................................ 63-57917
May 21, 1988 [JP] Japan ............................... 63-124780

[51] Int. Cl.$^5$ ............................................ G03B 13/20
[52] U.S. Cl. ................................. 354/164; 354/221; 358/225
[58] Field of Search ................. 354/400, 164, 221; 358/225

[56] References Cited

U.S. PATENT DOCUMENTS 4,697,897 10/1987 Tamamura ........................ 354/221
4,697,901 10/1987 Wakabayashi et al. ............. 354/221

FOREIGN PATENT DOCUMENTS

60-33541 2/1985 Japan .
60-70411 4/1985 Japan .

Primary Examiner—Russell E. Adams
Attorney, Agent, or Firm—Sandler & Greenblum

[57] ABSTRACT

A parallax correcting apparatus is provided which comprises an imaging device driving mechanism for supporting an imaging device so as to move away from and close to the optical axis of a finder optical system. The imaging device driving mechanism moves the imaging device in accordance with the object distance detected by an object distance measuring device. The invention is also directed to a parallax adjusting method and apparatus during assembly of a camera.

18 Claims, 8 Drawing Sheets

APPARATUS AND METHOD FOR CORRECTING AND ADJUSTING PARALLAX IN ELECTRONIC CAMERA

BACKGROUND OF THE INVENTION

1. Field of the Invention

The present invention relates to an apparatus for correcting for parallax in an electronic camera having a finder optical system separate from a photographing optical system, and also relates to apparatus and method for adjusting the parallax.

2. Description of Related Art

In automatic focusing electronic cameras having a photographing optical system and a finder optical system separate from the photographing optical system, there are various known mechanisms for adjusting parallax which occurs due to deviation of the optical axes of the optical systems, as disclosed, for example, in Japanese Unexamined Patent Publication Nos. 60-70411 and 60-33541.

However, in a known parallax correcting apparatus as disclosed in the above-mentioned Japanese Publication No. 60-70411, in which a frame defining a finder field of view is moved in response to an object distance signal output from an object distance measuring device, the finder field of view moves during viewing of the object and, accordingly, it is difficult for a photographer to view the object. In addition to the foregoing, no precise correction of the parallax can be performed in the known parallax adjusting apparatus.

In a known parallax correcting mechanism as disclosed in the above-mentioned Japanese Publication No. 60-33541, in which a photographic lens is moved in accordance with the object distance, an image forming area on a film or a solid state imaging device moves, resulting in a complex and large parallax correcting mechanism.

SUMMARY OF THE INVENTION

The primary object of the present invention is to provide a parallax correcting apparatus in an electronic camera in which the parallax can be easily and precisely corrected by a simple and light mechanism in accordance with a change of object distance without moving the finder field of view.

Another object of the present invention is to provide a parallax adjusting apparatus of an electronic camera in which the adjustment of parallax can be effected on the photographing optical system side, not on the finder optical system side, during assembly of the electronic camera.

It should be noted that "correction" of parallax referred to in the specification of the present invention, means to prevent an occurrence of parallax due to a change of the object distance, and "adjustment" of parallax, as used herein, means to prevent occurrence of parallax at a specific object distance during assembly of the camera.

To achieve the objects mentioned above, in an electronic camera having a photographing optical system, an object distance measuring device, a finder optical system separate from the photographing optical system, and an imaging device on which an image of an object is formed by the photographing optical system, according to the present invention, a parallax correcting apparatus is employed which comprises an imaging device driving mechanism for supporting the imaging device so as to move the imaging device away from and close to the optical axis of the finder optical system, said imaging device driving mechanism moving the imaging device in accordance with the object distance detected by the object distance measuring device.

With this arrangement, parallax can be corrected without moving the photographing lens and the finder field of view.

The concept of the present invention, in which parallax is corrected by moving the solid state imaging device relative to the finder optical system, can be applied to the adjustment of parallax upon assembly of the electronic still camera. Namely, an object at a specific object distance at which the parallax is to be eliminated is taken by the photographing optical system, and, then an image formed on the solid state imaging device is monitored by a CRT, so that the solid state imaging device can be moved relative to the finder optical system to adjust the parallax while comparing the monitored image with an actual viewing image of the finder optical system.

Namely, in an electronic camera having a photographing optical system, a finder optical system separate from the photographing optical system, and a solid state imaging device on which an image of an object is formed by the photographing optical system, according to the present invention, a parallax adjusting apparatus is provided during assembly which comprises a mechanism for supporting the imaging device so as to move away from and close to the optical axis of the finder optical system and for fixing the imaging device at an adjusted position.

The parallax adjusting apparatus can be combined with the above-mentioned parallax correcting apparatus. Namely, the frame of the solid state imaging device (which will be referred to as the solid state imaging device frame hereinafter) to which the solid state imaging device is to be secured, is movably supported to move away from, and close to, the optical axis of the finder optical system, and the solid state imaging device is thus adjustably supported relative to the solid state imaging device frame to move away from and close to the optical axis of the finder optical system, so that the solid state imaging device can be fixed at an adjusted position. With this arrangement, parallax can be during assembly by the adjustment of the position of the solid state imaging device relative to the solid state imaging device frame. Furthermore, the correction of parallax due to a change of object distance can be effected by moving the solid state imaging device frame, to which the solid state imaging device is secured, to come away from or close to the optical axis of the finder optical system, in accordance with the object distance.

The improvement of the present invention is also directed to a method for adjusting parallax, during assembly in an electronic camera having a photographing optical system, a finder optical system separate from the photographing optical system, a solid state imaging device on which an image of the object is formed by the photographing optical system, and means for moving and adjusting the solid state imaging device, at least in directions away from and close to the optical axis of the finder optical system.

In an electronic camera having a photographing optical system, a finder optical system separate from the photographing optical system, and a solid state imaging device on which an image of an object is formed by the photographing optical system, according to the present invention, a parallax adjusting method is used which comprises viewing an image of an object formed on the imaging device by the photographing optical system through a CRT, and moving the imaging device relative to the finder optical system to make the image of the object viewed by the CRT coincident with an image of the object viewed through the finder optical system, in order to adjust the parallax.

By the adjusting method mentioned above, parallax can be easily and precisely adjusted during assembly of the camera.

BRIEF DESCRIPTION OF THE DRAWINGS

The invention will be discussed below in detail, with reference to the accompanying drawings, in which.

DETAILED DESCRIPTION OF PREFERRED EMBODIMENTS

Figure 1:
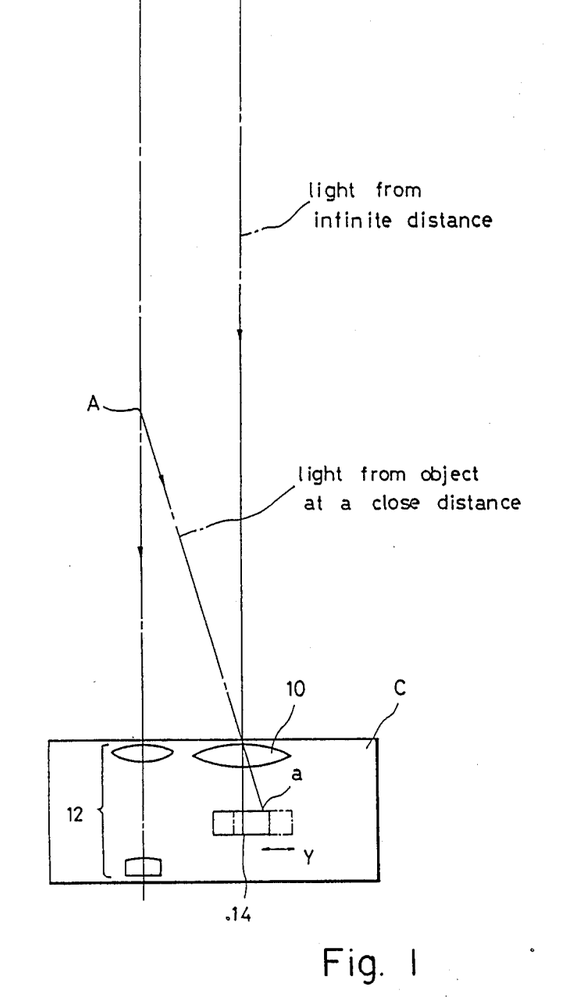
FIG. 1 is a plan view of the basic construction of a parallax correcting apparatus in an electronic camera, according to one aspect of the present invention.

FIG. 1 shows an electronic camera C having an automatic focusing device. The electronic camera C has a photographing lens 10 and a finder device 12 which is composed of an optical system different from that of the photographing lens 10. Rearwardly of the photographing lens 10 is provided a solid state imaging device 14 which is comprised of a CCD, so that object light passing the photographing lens 10 is focused on an imaging plane of the solid state imaging device 14. A picture signal of the solid state imaging device 14 is recorded as a electronic signal in a known recording medium, for example in a floppy disk (not shown).

The photographing lens 10 and the finder device 12 are arranged in such a way that the optical axes thereof are parallel to each other. The solid state imaging device 14 is movable to move away from and close to the optical axis of the finder device 12, in directions perpendicular to the optical axis of the solid state imaging device 14. The directions of movement of the solid state imaging device 14 away from and close to the optical axis of the finder device 12 are represented by the arrow Y in FIG. 1.

In FIG. 1, the light from an infinite object distance is incident upon the photographing lens 10 and the finder device 12, in directions which are substantially identical to the optical axes thereof.

On the other hand, the light from an object at a close distance, for example at a point A (on the optical axis of the finder device 12), which is a center of the finder field of view is incident upon the photographing lens at an incident angle, so that the light is focused onto a point a which is located at the right end of the solid state imaging device 14. Namely, the finder field of view through the finder device 12, and the photographing area of the photographing lens are different from each other, thus resulting in the occurrence of a parallax.

According to the basic concept of the present invention, the solid state imaging device 14 is moved in the direction Y in accordance with the deviation (difference), i.e., in accordance with the object distance from the point A, so as to form an image at a center of the solid state imaging device 14 in order to eliminate parallax.

An embodiment of the parallax correcting apparatus based on the concept mentioned above will be explained below with reference to FIG. 2. An object distance signal from an object distance measuring device 20 is input to a control circuit (CPU) 21 which drives an AF (Automatic Focusing) motor 22 in response to the object distance signal to move a focusing lens group (not shown) of the photographing lens 10. Namely, the control circuit 21 rotates the AF motor 22 in accordance with the object distance signal so as to move the focusing lens group to a focal point.

If the photographing lens 10 is a zoom lens, the focal point of the focusing lens group, and accordingly, the displacement of the focusing lens group necessary to move the focal point for the same object distance, depends upon the focal length. In the case of a zoom lens, therefore, the focal length of the photographing lens 10 is detected by a focal length detecting device 23, so that the focal length signal of the latter is input to the control circuit 21 in which the focal length signal is used as a parameter for controlling the angular displacement of the AF motor 22.

The AF motor 22 is used also as a driving source for an imaging device driving mechanism 25. Namely, the AF motor 22 drives the imaging device driving mechanism 25 as well as the focusing lens group. The solid state imaging device 14 lies in a plane perpendicular to the optical axis of the photographing lens 10 and is adapted to be moved by the imaging device driving mechanism 25 in a direction perpendicular to the optical axis of the photographing lens 10. When the AF motor 22 is driven, in accordance with the object distance to drive the imaging device drive mechanism 25 in association with movement of the focusing lens group, the solid state imaging device 14 is moved in directions Y in order to correct the parallax.

The imaging device driving mechanism for moving the solid state imaging device 14 will be explained below with reference to FIG. 3. The focusing lens group is inserted in a stationary lens barrel 30 of the photographing lens 10 so as to move in the optical axis direction. An annular AF motor 31 which drives the focusing lens group is fitted into the stationary lens barrel 30. The annular AF motor 31 has a rotor 32 which is connected to the focusing lens group through a cam mechanism, so that when the rotor 32 rotates, the focusing lens group is moved in the optical axis direction to adjust the focus. The rotor 32 is provided, on its outer periphery, with a gear 33 secured thereto which is engaged by a pinion 34a of a reduction gear train 34.

The solid state imaging device 14 is secured to an imaging device frame 35 which lies in a plane perpendicular to the optical axis of the photographing lens 10 so as to move in the focal plane of the photographing lens 10, in order to move away from and close to the optical axis of the finder device 12 in the directions Y. The imaging device frame 35 is provided, on its lower end face, with a rack 36 which is engaged by terminal pinion 34b of the reduction gear train 34. Accordingly, when the AF annular motor 31 rotates to move the focusing lens group, the imaging device frame 35, and, accordingly, the solid state imaging device 14, are moved in the directions Y through the gear 33, the reduction gear train 34 and the rack 36 to correct the parallax. The displacement of the solid state imaging device 14 is determined by the gear ratio between the gear 33, the reduction gear train 34 and the rack 36, or the pitch of the teeth of the rack 36, depending upon the focal length of the photographing lens 10 and the optical axis distance between the photographing lens 10 and the finder device 12.

Preferably, movement of the solid state imaging device 14 takes place along an image forming plane of the photographing lens, since the least aberration occurs on the image forming plane. If the photographing lens 10 comprises an aspherical lens, the directions of movement of the solid state imaging device 14 can be normal to the optical axis of the aspherical lens.

As can be understood from the above discussion, according to the present invention, it is possible to make the finder field of view coincident with the picture image. Furthermore, since the finder field of view does not move, it does not interfere with the photographer's view. As a power source for the focusing lens group, a cylindrical motor, which is known per se, can be used in place of the annular AF motor 31.

Figure 2:
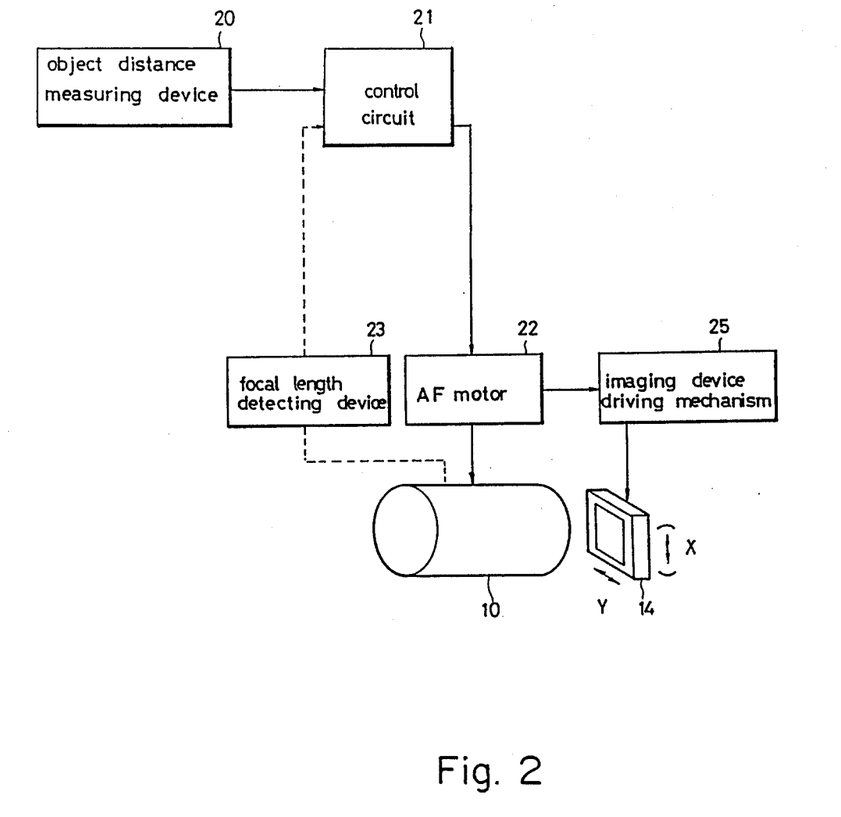
FIG. 2 is a block diagram showing a control system of the parallax correcting apparatus shown in FIG. 1.
Figure 3:
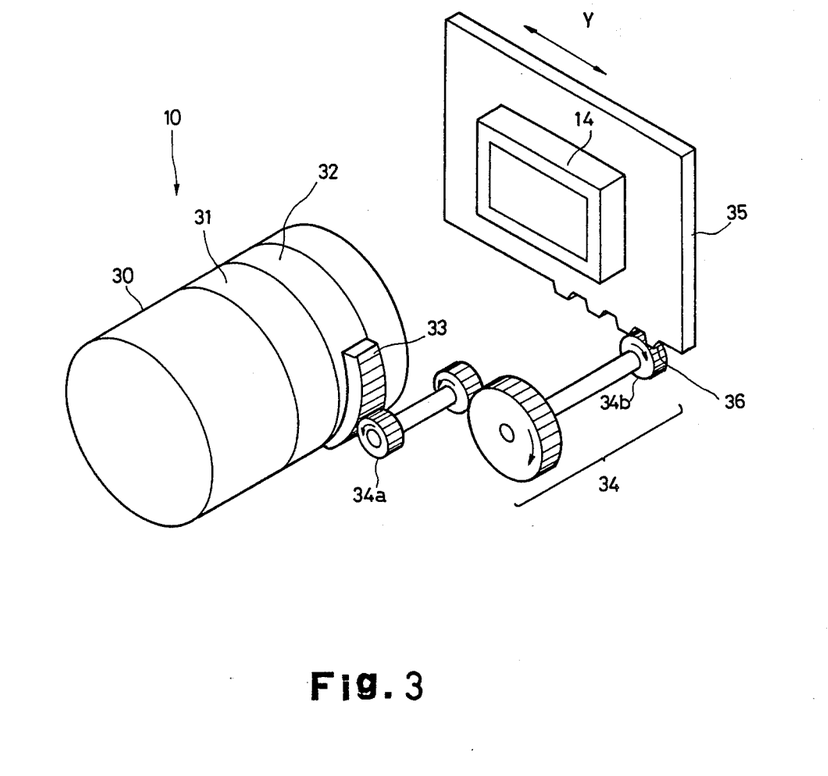
FIG. 3 is a perspective view of the parallax correcting mechanism shown in FIG. 1.
Figure 4:
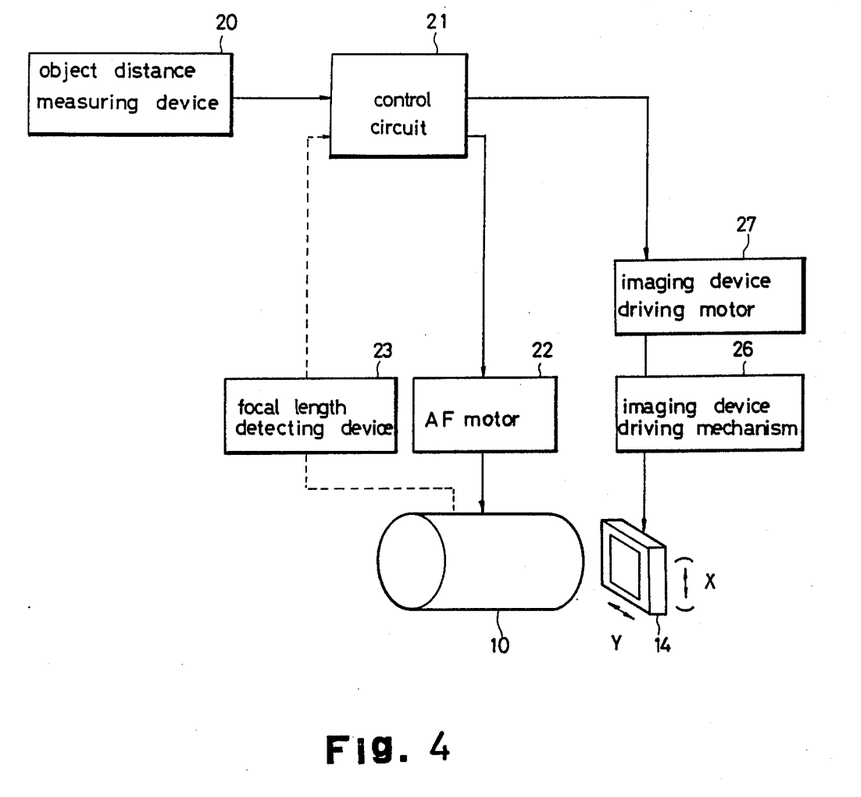
FIG. 4 is a block diagram showing a control system of a parallax correcting apparatus according to another aspect of the present invention.

FIG. 4 shows a different embodiment of the present invention, in which elements corresponding to those in the above-mentioned embodiment are designated with the same reference numerals as those in FIGS. 1~3. In FIG. 4, a separate imaging device driving motor 27 is used as a drive source for the imaging device driving mechanism 26, in place of the AF motor 22 as shown in FIG. 2. The control circuit 21 outputs the control signal in response to the object distance signal from the object distance measuring device 20, so as to drive the imaging device driving motor 27 in order to drive the imaging device driving mechanism 26.

The subject of the present invention is not directly directed to the internal construction of the imaging device driving mechanism 26 and its associated power source. Accordingly, the internal construction of imaging device driving mechanism 26 and its associated power source are not limited to any specific structure. For instance, in place of the imaging device driving motor 27, a bimorph type or multi-layered type piezoelectric member can be used. In this case, the deformation (bent, extension or contraction) of the piezoelectric member is converted into movement of the imaging device frame.

Figure 5:
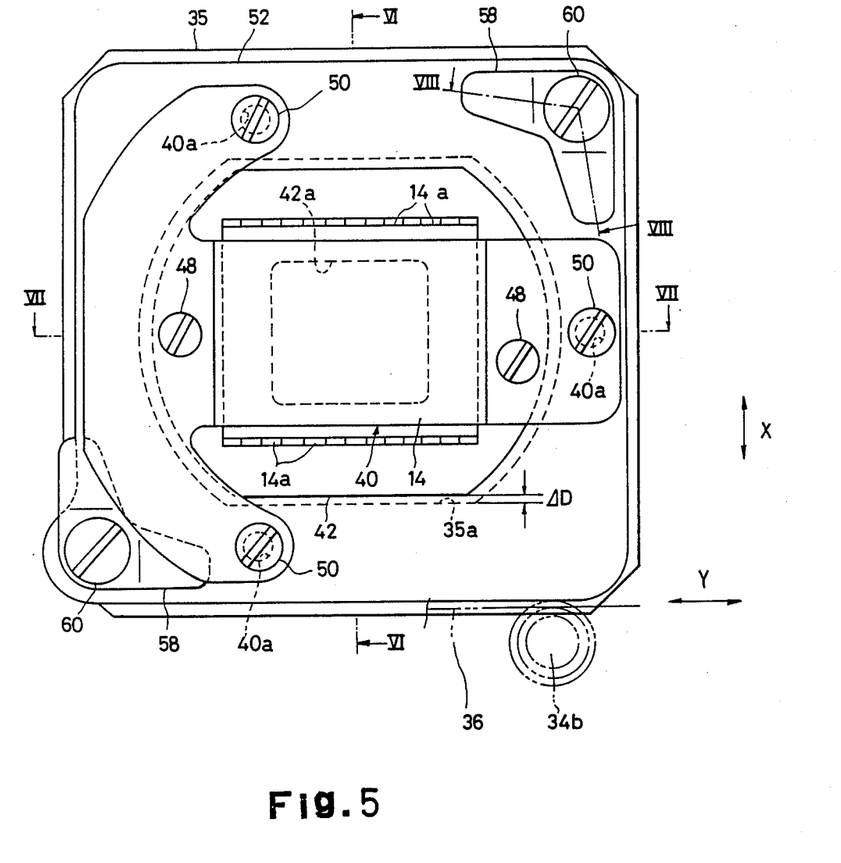
FIG. 5 is a rear view of a solid state imaging device frame which supports a solid state imaging device in a parallax correcting and adjusting mechanism of an electronic still camera, according to the present invention.
Figure 6:
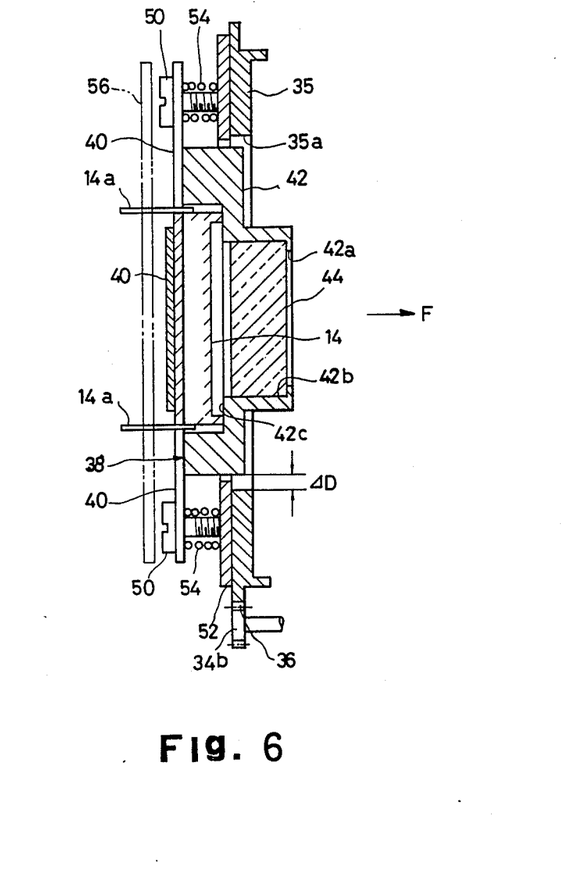
FIG. 6 is a sectional view taken along the line VI—VI in FIG. 5.
Figure 7:
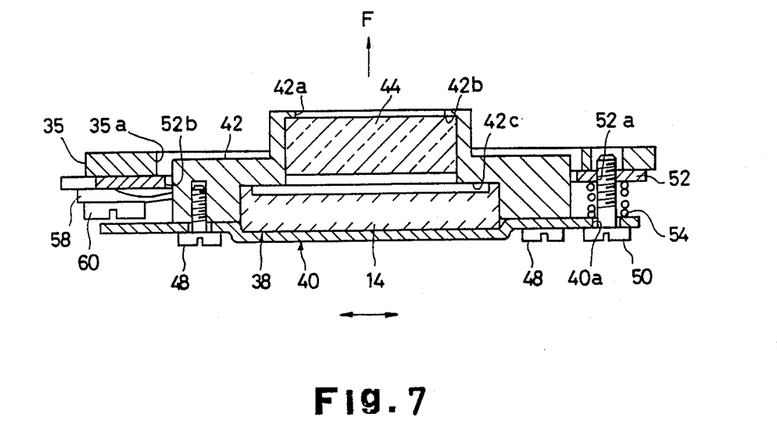
FIG. 7 is a sectional view taken along the line VII—VII in FIG. 5.

FIGS. 5 through 8 show an embodiment of the parallax adjusting apparatus, after assembly of the electronic still camera, in which the solid state imaging device 15 is movable in directions Y relative to the imaging device frame 35. The front (close to the object) of the camera in FIGS. 6 and 7 is represented by an arrow F.

The imaging device frame 35 has a center opening 35a. An imaging device mounting member (photographing block) 38 which will be explained below is mounted to the imaging device frame 35. A generally T-shaped imaging device supporting plate 40 has a center recess which is concave in a backward direction, as shown in FIG. 7. A keeper frame 42 has an opening 42a which is located at the front center surface thereof to project forwardly and two-stepped recesses, i.e., recesses 42b and 42c on the rear center surface, as shown in FIGS. 6 and 7. A filter 44 is fitted in the recess 42b, and the solid state imaging device 14 is fitted in the recess 42c. The filter 44 and the solid state imaging device 14 are secured to the imaging device supporting plate 40 by the keeper frame 42 which is secured to the imaging device supporting plate 40 by set screws 48.

The imaging device supporting plate 40 has holes 40a at three end portions of the "T" formed by the device so that adjusting screws 50 extend through the associated holes 40a. As can be seen in FIG. 7, the front ends of the adjusting screws 50 are screwed into correponding threaded holes 52a formed in the mounting plate 52. Between the imaging device supporting plate 40 and the mounting plate 52 are provided compression coil springs 54 which surround the corresponding adjusting screws 50 in order to press the plates 40 and 52 far away from each other. Mounting plate 52 has an opening 52b through which the keeper frame 42 projects forwardly.

The solid state imaging device 14 has a plurality of terminal pins 14a which are secured to a printed circuit board 56, shown by the dotted-dashed line in FIG. 6, and which are adapted to be electrically connected thereto.

The imaging device mounting member 38, as constructed above, is mounted to the rear face of the imaging device frame 35, by the use of leaf springs 58, via the mounting plate 52, as follows.

Figure 8:
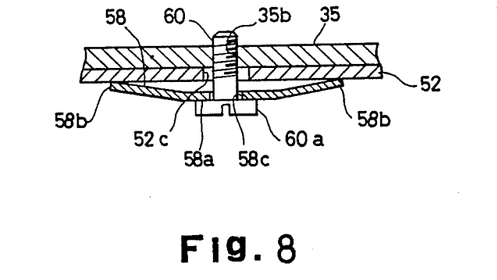
FIG. 8 is a sectional view taken along the line VIII—VIII in FIG. 5.

Namely, the generally L-shaped leaf springs 58 have raised center portions 58a (FIG. 8) and opposite ends 58b (FIG. 8) which are connected to the center portions by inclined surfaces, as shown in FIG. 8. The center portions 58a of the leaf springs 58 have center holes 58c. The mounting plate 52 has two through holes 52c on the diagonally opposed ends thereof, and the imaging device frame 35 has threaded holes 35b corresponding to the through holes 52c. Screws 60 extend through the associated holes 58c of the leaf springs 58, so that the front ends of the screws 60 are screwed into the corresponding threaded holes 35b of the imaging device frame 35. Consequently, the mounting plate 52 can be pressed against the imaging device frame 35 with a predetermined contacting pressure, via the leaf springs 58, between the heads 60a of the screws 60 and the mounting plate 52.

When the mounting plate 52 is mounted to the imaging device frame 35, there is a gap $\Delta D$ between the opening 35a of the imaging device frame 35 and the keeper frame 42, as shown in FIG. 6, so that the position of the imaging device 14 can be adjusted in directions Y, and in directions X, normal to directions Y.

Therefore, the imaging device mounting member 38 is provisionally mounted onto the imaging device frame 35 by the leaf springs 58 with an appropriate pressing force, which permits the mounting plate 52 to move along the plane but which prevents the mounting plate 52 from being accidentally moved. An object which is located at a predetermined object distance from the camera is viewed by the solid state imaging device 14 through the photographing lens system 10, and then the image of the object is monitored by the CRT monitor. When the solid state imaging device 14 is moved along a plane perpendicular to the optical axis of the photographing lens system 10 without moving the camera, the field of view in the monitor picture is varied.

An object which is located at a specific object distance, at which the parallax should be eliminated, is viewed through the finder device 12 by a photographer. After that, the mounting plate 52 is moved in the plane by using a proper jig (not shown) to make the field of view of the monitor picture coincident with the field of view of the finder device 12. Generally speaking, the displacement (adjusting area) of the mounting plate 52 is satisfactorily 1 mm×1 mm (X-Y directions). It goes without saying that the adjustment can be effected in both directions X and Y.

When both of the fields of view are coincident with each other, the screws 60 are firmly fastened to strongly press the mounting plate 52 against the imaging device frame 35, so that the mounting plate 52 can be firmly connected to the imaging device frame 35.

When the three adjusting screws 50 are rotated, the three associated points of the imaging device supporting plate 40 can be moved to come away from or close to the mounting plate 52, so that adjustment of the position of the solid state imaging device 14 in the optical axis direction of the photographing lens system 10, i.e., focusing for a specific object distance, can be effected.

It is also possible to view the finder device through another camera in order to show the image on the CRT monitor, so that the picture of the finder monitor and the monitor picture by the imaging device can be compared with each other to make the fields of view coincidental with each other. Furthermore, the adjustment can be automatically effected by using an image processing technique, which technique is per se known.

The mechanism for adjusting the parallax upon assembly, as mentioned above, can be applied not only solely to an electronic camera in which the imaging device frame 35 is secured to the camera body, but also in combination with a mechanism for correcting parallax in accordance with the object distance, as discussed above for the foregoing embodiments. Namely, similarly to the previously mentioned embodiment, a rack 36, which extends in the directions Y, is provided, for example, on the imaging device frame 35 in order to be engaged by the pinion 34b, so that when the pinion 34b is rotated by an angular displacement corresponding to the object distance, parallax can be always eliminated independently of the object distance.

Figure 9:
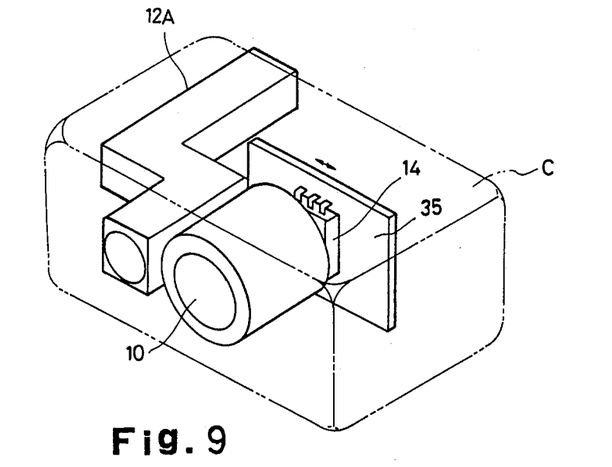
FIG. 9 is a perspective view of an electronic camera showing another arrangement of a photographing optical system and a finder optical system.
Figure 10:
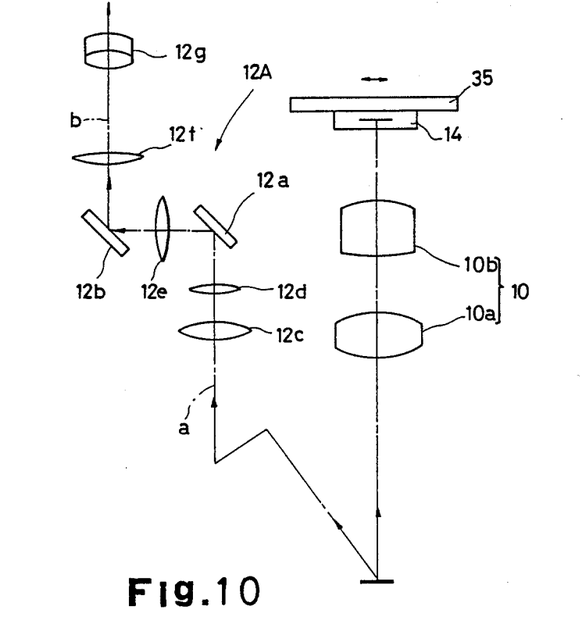
FIG. 10 is a schematic view of an optical arrangement of an electronic camera shown in FIG. 9.

FIGS. 9 and 10 show a different arrangement of the finder device 12 relative to the photographing lens 10. In this modified arrangement, the finder device 12A has a pair of mirrors 12a and 12b which change the direction of the light path twice, in a crank type of shape, so that the light path a in front of the mirror 12a and the light path b in rear of the mirror 12b are parallel with the optical axis of the photographing lens 10. The finder device 12A has an objective lens 12c, intermediate lenses 12d, 12e and 12f, and an eye-piece 12g. The change of direction of the light path, in the substantially crank shape makes it possible to easily provide a moving space for the solid state imaging device 14. Note that in the modified arrangement shown in FIG. 10, photographing lens 10 includes a front lens group 10a and a rear lens group 10b.

The present invention can be applied not only to an electronic still camera as constructed above but also to an electronic movie camera. In other words, the present invention is applicable to any camera using a solid state imaging device.

We claim:

1. In an electronic camera having a photographing optical system, an object distance measuring device, a finder optical system separate from the photographing optical system, and an imaging device on which an image of an object is formed by the photographing optical system, a parallax correcting apparatus which comprises an imaging device driving mechanism for supporting the imaging device so as to move away from and towards the optical axis of the finder optical system, said imaging device driving mechanism being adapted to move the imaging device in accordance with the object distance detected by the object distance measuring device.

2. A parallax correcting apparatus according to claim 1, further comprising an imaging device frame to which the imaging device is secured, said imaging device frame being movably supported on an image forming plane of the photographing optical system.

3. A parallax correcting apparatus according to claim 2, further comprising a focusing motor which operates in accordance with the object distance detected by the object distance measuring device, and a gear train which drives the imaging device frame in association with the focusing motor.

4. A parallax correcting apparatus according to claim 2, further comprising an imaging device driving motor which operates in accordance with the object distance to move the imaging device frame.

5. A parallax correcting apparatus according to claim 2, further comprising a piezoelectric member which drives the imaging device frame in accordance with the object distance measured by the object distance measuring device.

6. A parallax correcting apparatus according to claim 2, wherein an initial position of the imaging device is adjustable relative to the imaging device frame along the optical axis direction of the finder optical system.

7. An electronic camera having a photographing optical system, a finder optical system separate from the photographing optical system, and a solid state imaging device on which an image of an object is formed by the photographing optical system, wherein the camera comprises a mechanism for moving the imaging device to move away from and towards the optical axis of the finder optical system.

8. In an electronic camera having a photographing optical system, a finder optical system separate from the photographing optical system, and a solid state imaging device on which an image of an object is formed by the photographing optical system, a parallax adjusting apparatus which comprises means for movably supporting the imaging device away from and towards the optical axis of the finder optical system, and means for fixing the imaging device at an adjusted position.

9. A parallax adjusting apparatus according to claim 8, further comprising an imaging device frame having a plane normal to the optical axis of the photographing optical system, an imaging device, a mounting member to which the imaging device is mounted and which has a plane parallel to the plane of the imaging device, first securing means for slidably mounting the mounting member relative to the imaging device frame while maintaining planes of the imaging device frame and the mounting member parallel to each other, and second securing means for securing the mounting member to the imaging device frame.

10. A parallax adjusting apparatus according to claim 9, wherein said first and second securing means comprise threaded holes provided in the plane of the imaging device frame and through holes formed in the plane of the imaging device mounting member, wherein the inner diameter of each of the through holes is larger than the inner diameter of each of the threaded holes, set screws which extend through the through holes and which are adapted to be screwed in the corresponding threaded holes, and leaf springs which are provided between the set screws and the imaging device mounting member, so that when the set screws are loosely fastened, the imaging device mounting member is slidable relative to the imaging device frame within a space which exists between the through holes and the threaded holes, and when the set screws are tightly fastened, the imaging device mounting member is adapted to be integrally connected to the imaging device frame.

11. A parallax adjusting apparatus according to claim 9, wherein said imaging device mounting member comprises an imaging device supporting plate, a keeper frame which secures the imaging device between said imaging device supporting plate and said keeper frame, and a mounting member to which said imaging device supporting plate is mounted.

12. A parallax adjusting apparatus according to claim 11, wherein said imaging device support plate is generally T-shaped.

13. A parallax adjusting apparatus according to claim 12, wherein said imaging device mounting member has three holes at three end portions of said "T", and said imaging device supporting plate has three corresponding threaded holes in which adjusting screws extending through said three holes are adapted to be screwed.

14. A parallax adjusting apparatus according to claim 13, wherein said first and second securing means comprise threaded holes provided in the plane of the imaging device frame, and through holes formed in the plane of the mounting plate, the inner diameter of each of the through holes being larger than the diameter of each of the threaded holes, set screws which extend through the through holes and which are adapted to be screwed into corresponding threaded holes, and leaf springs which are provided between the set screws and the mounting plate, so that when the set screws are loosely fastened, the mounting plate is slidable relative to the imaging device frame, with a space which exists between the through holes and the threaded holes, and so that when the set screws are tightly fastened, the mounting plate can be integrally connected to the imaging device frame.

15. A method of adjusting parallax in an electronic cameral having a photographing optical system, a finder optical system separate from the photographing optical system, and a solid state imaging device on which an image of an object is formed by the photographing optical system, said method comprising viewing an image of an object formed on the imaging device by the photographing optical system through a first display means, and moving the imaging device relative to the finder optical system to make the image of the object viewed by the first display means coincident with an image of the object viewed through the finder optical system, in order to adjust for parallax.

16. A parallax adjusting method according to claim 15, wherein the image of the object to be viewed by the finder optical system is viewed by a second display means, so that adjustment of parallax can be effected by viewing the images of the object through both of said display means.

17. A parallax adjusting method according to claim 15, wherein said display means comprise a CRT.

18. A parallax adjusting method according to claim 16, wherein said display means comprise a CRT.

* * * * *

UNITED STATES PATENT AND TRADEMARK OFFICE
CERTIFICATE OF CORRECTION

PATENT NO. : 4,924,247

DATED : May 8, 1990

INVENTOR(S) : Nobuharu SUZUKI et al.

It is certified that error appears in the above-identified patent and that said Letters Patent is hereby corrected as shown below:

On column 3, line 55, change "a" to ---an--- before "electronic".
On column 4, line 6, insert ---.--- after "view".

On column 5, line 65, change "15" to ---14---.
On column 7, lines 35/36, change "coincidental" to ---coincident---.

On column 7, line 64, insert ---.--- after "shape".
On column 10, line 19, i.e., in claim 15, line 2, change "camera" to ---camera---.

Signed and Sealed this

Fourteenth Day of July, 1992

Attest:

DOUGLAS B. COMER

*Attesting Officer*  *Acting Commissioner of Patents and Trademarks*